United States Patent
Matsuo

(10) Patent No.: US 10,212,626 B2
(45) Date of Patent: Feb. 19, 2019

(54) BASE STATION AND COORDINATED TRANSMISSION MODE SELECTION METHOD

(71) Applicant: Panasonic Intellectual Property Management Co., Ltd., Osaka (JP)

(72) Inventor: Hidenori Matsuo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 15/500,488

(22) PCT Filed: Mar. 17, 2015

(86) PCT No.: PCT/JP2015/001468
§ 371 (c)(1),
(2) Date: Jan. 30, 2017

(87) PCT Pub. No.: WO2016/084268
PCT Pub. Date: Jun. 2, 2016

(65) Prior Publication Data
US 2017/0230868 A1 Aug. 10, 2017

(30) Foreign Application Priority Data
Nov. 28, 2014 (JP) .................. 2014-241756

(51) Int. Cl.
*H04W 28/16* (2009.01)
*H04W 92/20* (2009.01)
(Continued)

(52) U.S. Cl.
CPC ........... *H04W 28/16* (2013.01); *H04L 5/0035* (2013.01); *H04W 92/20* (2013.01); *H04L 5/001* (2013.01); *H04L 5/0085* (2013.01); *H04W 88/10* (2013.01)

(58) Field of Classification Search
CPC . H04W 72/0426; H04W 28/16; H04W 88/10; H04W 92/20; H04L 1/1861; H04L 1/1887; H04L 5/0032
See application file for complete search history.

(56) References Cited

U.S. PATENT DOCUMENTS 9,461,788 B2 10/2016 Morita
2014/0293914 A1* 10/2014 Maattanen ........ H04W 72/1278
370/329

(Continued)

FOREIGN PATENT DOCUMENTS

JP    2012-034054 A    2/2012
WO    2013/111818 A1   8/2013

(Continued)

OTHER PUBLICATIONS

International Search Report dated May 19, 2015, for corresponding International Application No. PCT/JP2015/001468, 4 pages.

*Primary Examiner* — Mewale A Ambaye
(74) *Attorney, Agent, or Firm* — Seed IP Law Group LLP

(57) ABSTRACT

An optimal mode is selected in a coordinated transmission, depending on a situation of a network, and thus, it is possible to increase performance of a system. Coordinated mode selector (112) selects a JT mode in a case where X2 transmission time included in feedback information received from another base station is less than a second threshold, and selects a Blanking mode in a case where the X2 transmission time is greater than or equal to the second threshold. Base station to base station coordinating controller (113) performs base station to base station coordination control between another base station and a base station so as to perform a coordinated mode stored in memory unit (104) in a case where the coordinated transmission starts, and performs the base station to base station coordination control between another base station and the base station again so as to (Continued)

perform the coordinated mode newly selected in a case where the coordinated mode selected by coordinated mode selector (112) changes.

8 Claims, 3 Drawing Sheets

(51) Int. Cl.
  *H04L 5/00* (2006.01)
  *H04W 88/10* (2009.01)

(56) References Cited

U.S. PATENT DOCUMENTS

| | | |
|---|---|---|
| 2015/0036608 A1 | 2/2015 | Morita |
| 2015/0036658 A1 | 2/2015 | Mochizuki et al. |
| 2015/0171984 A1* | 6/2015 | Jitsukawa ............ H04J 11/0053 370/329 |
| 2015/0304881 A1* | 10/2015 | Lee ................... H04L 25/03891 370/235 |
| 2015/0358989 A1* | 12/2015 | Ni ..................... H04W 72/1226 370/330 |

FOREIGN PATENT DOCUMENTS

| | | |
|---|---|---|
| WO | 2013/122163 A1 | 8/2013 |
| WO | 2014/034679 A1 | 3/2014 |

\* cited by examiner

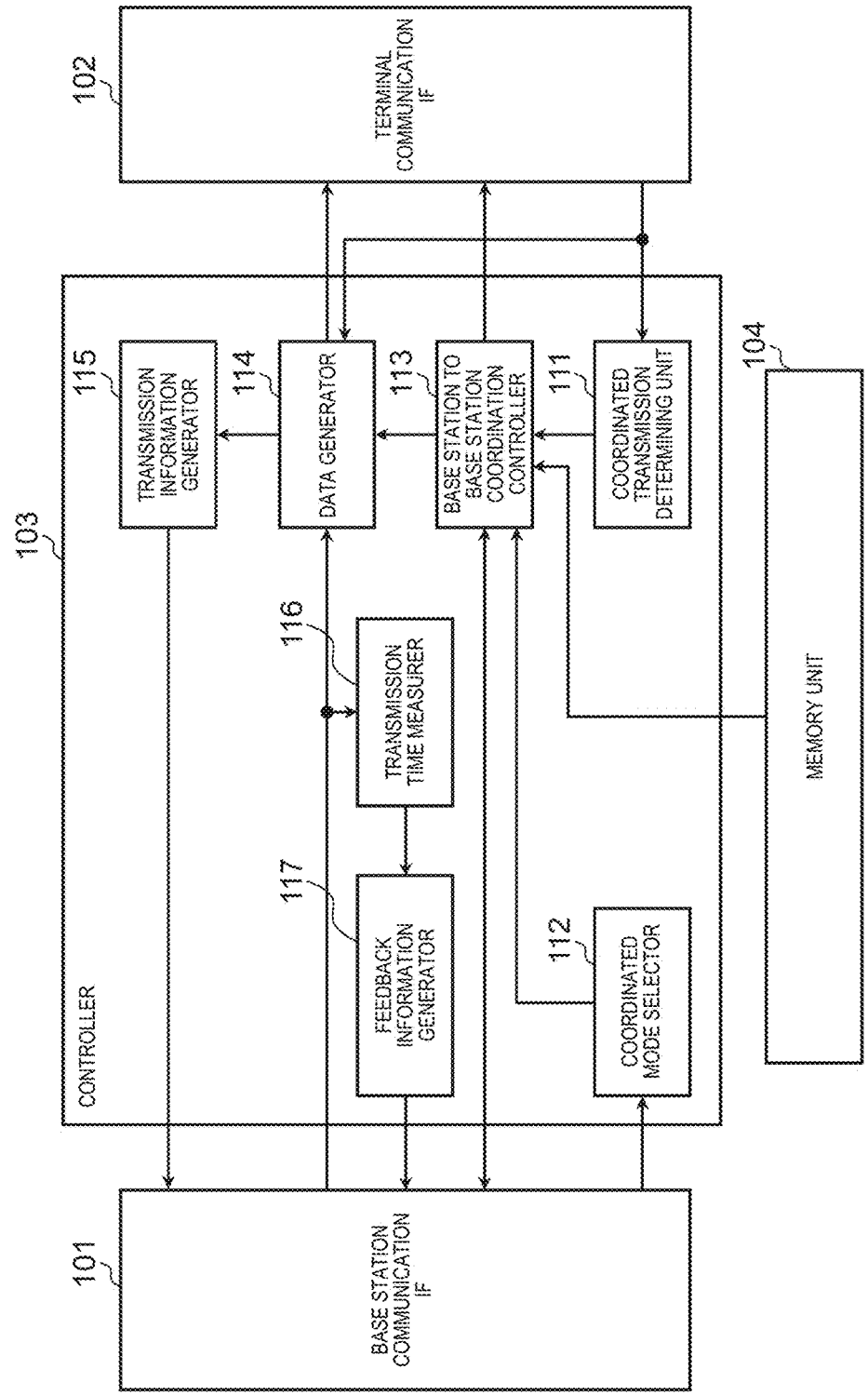

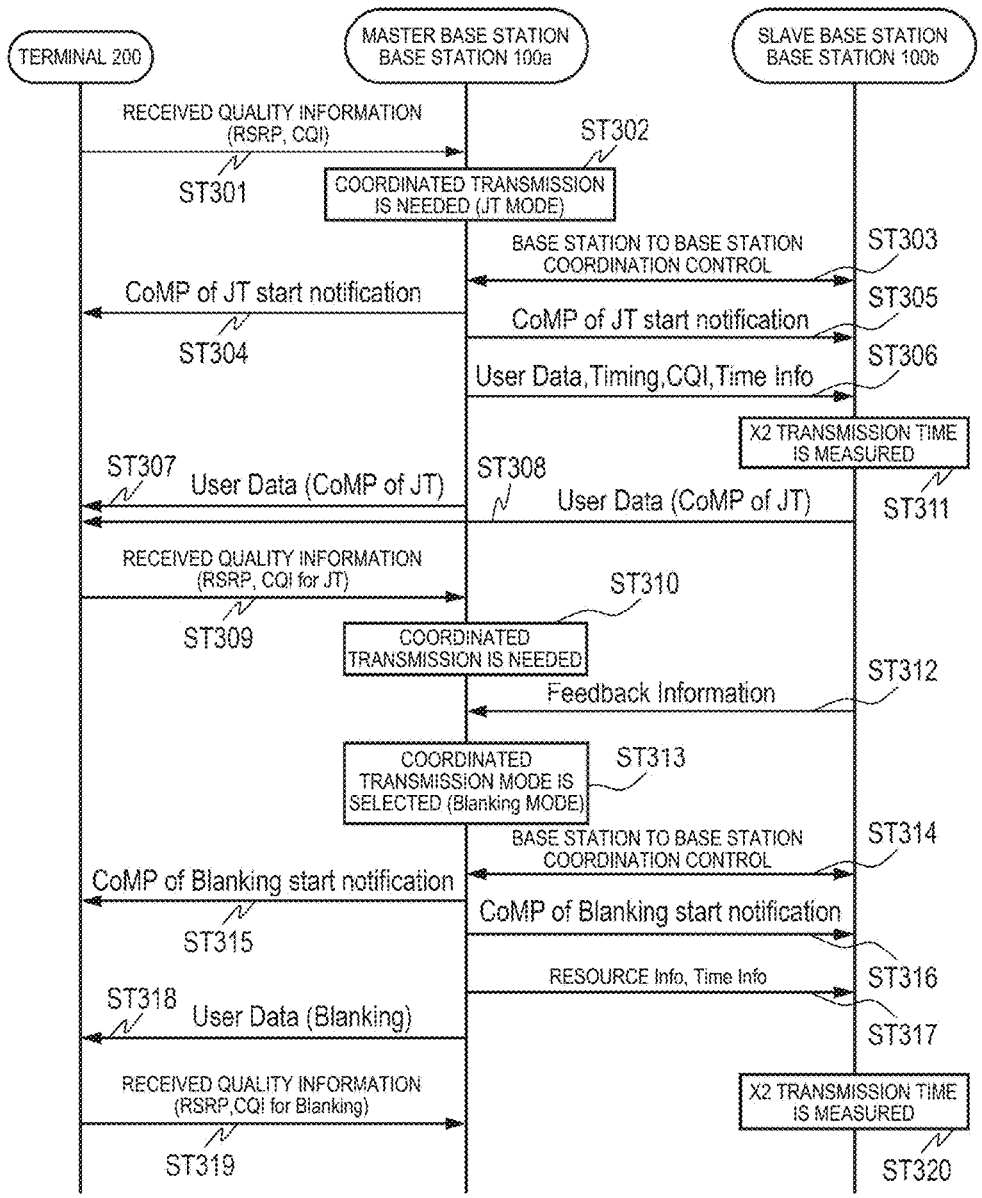

BASE STATION AND COORDINATED TRANSMISSION MODE SELECTION METHOD

TECHNICAL FIELD

The present invention relates to a base station being used for a communication system which uses a multipoint coordination technology and a coordinated transmission mode selection method.

BACKGROUND ART

A standardization organization 3GPP (The 3rd Generation Partnership Project) performs standardization of an LTE-Advanced (Long Term Evolution Advanced: LTE-A) mode as a communication standard of the next generation compatible with an LTE (Long term Evolution) mode. In the LTE-A mode, a wireless communication device (NE: Network Entity) of a network (E-UTRAN: Evolved Universal Terrestrial Radio Access Network) provides one or more communication cells (Hereinafter, simply referred to as cell). The wireless communication device is a device which is an access point of a wireless communication terminal (UE: User Equipment), such as, a base station (ENB: E-UTRAN Node B), a relay device (RN: Relay Node), or a repeater. The wireless communication terminal is included in one of the cells that the wireless communication device provides, and communicates with the wireless communication device of the cell that its own station is included. Hereinafter, the wireless communication terminal is simply referred to as "terminal".

Introduction a CoMP (Coordinated Multiple-point Transmission/reception) technology in which a plurality of wireless communication devices perform multipoint coordination for one terminal and transmit wireless signals to the terminal into the LTE-A mode is reviewed. Characteristics of reception of a signal for the terminal can be increased by using the CoMP technology.

For example, the plurality of wireless communication devices which are used for the CoMP technology are respectively base stations (ENB) which can operate independently. One base station operates as a master base station performing concentrative control, and remaining base stations operate according to instruction of the master base station as a slave base station.

An IP (Internet Protocol) line which is called an X2 interface defined by 3GPP is connected between a mater base station and a slave base station. In a case where the CoMP technology is applied to a system of the known LTE mode, a system which cheaply uses the CoMP technology by using a public IP network can be introduced by using the X2 interface.

One of the CoMP technologies is a JT (Joint Transmission) mode. In the JT mode, a master base station transmits information necessary for performing coordinated transmission, such as, user data, transmission timing information, or a CQI (Channel Quality Indicator) to a slave base station through the X2 interface. A slave base station transmits the same user data in the same coding rate/modulation mode at the same timing as the master base station by using the same wireless resource. For this reason, a terminal can increase received power by synthesizing electric wave transmitted from a plurality of wireless communication devices, that is, the master base station and the slave base station.

One of modes different from the JT mode of the CoMP technology is a Blanking mode. In the Blanking mode, when the master base station transmits data by using predetermined wireless resource, the slave base station does not transmit (Muting) the user data by using the wireless resource. Thereby, interference power of the master base station decreases.

In the Blanking mode, the master base station transmits only the wireless resource which transmits data to the slave base station through the X2 interface, and does not transmit the user data, the transmission timing information, and the CQI. For this reason, it is possible to prevent traffic between base stations from increasing.

CITATION LIST

Patent Literature

PTL 1: International Publication No. 2013/111818

SUMMARY OF THE INVENTION

Since an X2 interface is a transmission path with delay, transmission time (Hereinafter, X2 transmission time) of data passing through the X2 interface changes depending on a situation of a network of traffic or the like.

In a JT mode, if coordinated transmission timing between base stations is set according to the longest X2 transmission time, even in a case where the situation of the network is good and the X2 transmission time is short, it takes time until a master base station and a slave base station transmit next data, and thus, transmission efficiency is degraded. In addition, since it takes time until next data is transmitted after a terminal reports CQI to a master base station, an environment of a transmission path changes therebetween, and thereby, there is a possibility that reception performance of the terminal is degraded, for example, an error rate increases. In addition, a base station is defined by an LTE-A mode, and thus, there is a possibility that retransmission data cannot be transmitted within eight subframes that are a retransmission interval corresponding to eight processes which are the number of processes of a hybrid automatic retransmission request (Hybrid Automatic Repeat Request: HARQ).

Measurement in the JT mode, if the coordinated transmission timing between base stations is set according to time shorter than the longest X2 transmission time, in a case where actual X2 transmission time is longer than the set time, a slave base station cannot transmit user data up to coordinated transmission timing, and thus, packets are discarded. In this case, although MCS (Modulation and channel Coding Scheme) is selected and the CQI is reported by assuming the coordinated transmission, a terminal transmits an electric wave only to the master base station, and thus, reception performance is degraded.

In addition, in a case where the X2 transmission time is short, a utility rate of resources of the Blanking mode is lower than that of the JT mode, and transmission efficiency is degraded.

In this way, if the coordinated transmission is performed by using the X2 interface, the X2 transmission time changes according to the situation of the network, and thus, when only any one of the JT mode and the Blanking mode is used, performance of a system such as transmission efficiency or reception performance is degraded, compared with other modes.

An object of the present invention is to provide a base station and a coordinated transmission mode selection method which can select an optimal mode depending on a situation of a network and increase performance of a system, in a case where coordinated transmission is performed.

A base station according to an aspect of the present invention has a configuration in which the base station which can perform coordinated transmission with another base station combined by an X2 interface that is defined by 3GPP includes a coordinated mode selector that selects a JT (Joint Transmission) mode in a case where X2 transmission time which is transmission time of data passing through the X2 interface is less than a threshold, and selects a Blanking mode in a case where the X2 transmission time is greater than or equal to the threshold; and a base station to base station coordination controller which performs base station to base station coordination control between another base station and the base station so as to perform a coordinated mode selected by the coordinated mode selector.

A base station according to an aspect of the present invention has a configuration in which the base station which can perform coordinated transmission with another base station combined by an X2 interface that is defined by 3GPP includes a transmission time measurer which measures an X2 transmission time that is transmission time of data passing through the X2 interface; a feedback information generator which transmits information indicating the X2 transmission time to another base station; and a base station to base station coordination controller which performs base station to base station coordination control between another base station and the base station so as to perform a coordinated mode selected by another base station on the basis of the X2 transmission time.

A coordinated transmission mode selection method of a base station according to an aspect of the present invention includes a step of determining whether or not a coordinated transmission with another base station combined by an X2 interface which is defined 3GPP needs to be performed based on a channel quality indicator transmitted from a terminal; and a step of selecting a JT mode in a case where an X2 transmission time which is a transmission time of data passing through the X2 interface is less than a threshold, and selecting a Blanking mode in a case where the X2 transmission time is greater than or equal to the threshold, in a case where the coordinated transmission needs to be performed.

According to the present invention, in a case where the coordinated transmission is performed, an optimal mode can be selected depending on a situation of a network, and thus, it is possible to increase performance of a system.

BRIEF DESCRIPTION OF DRAWINGS

FIG. 2 is a block diagram illustrating a configuration of the base station according to the embodiment of the present invention.

FIG. 3 is a sequence diagram illustrating a flow of operations of the base station according to the embodiment of the present invention and a terminal.

DESCRIPTION OF EMBODIMENT

Figure 1:
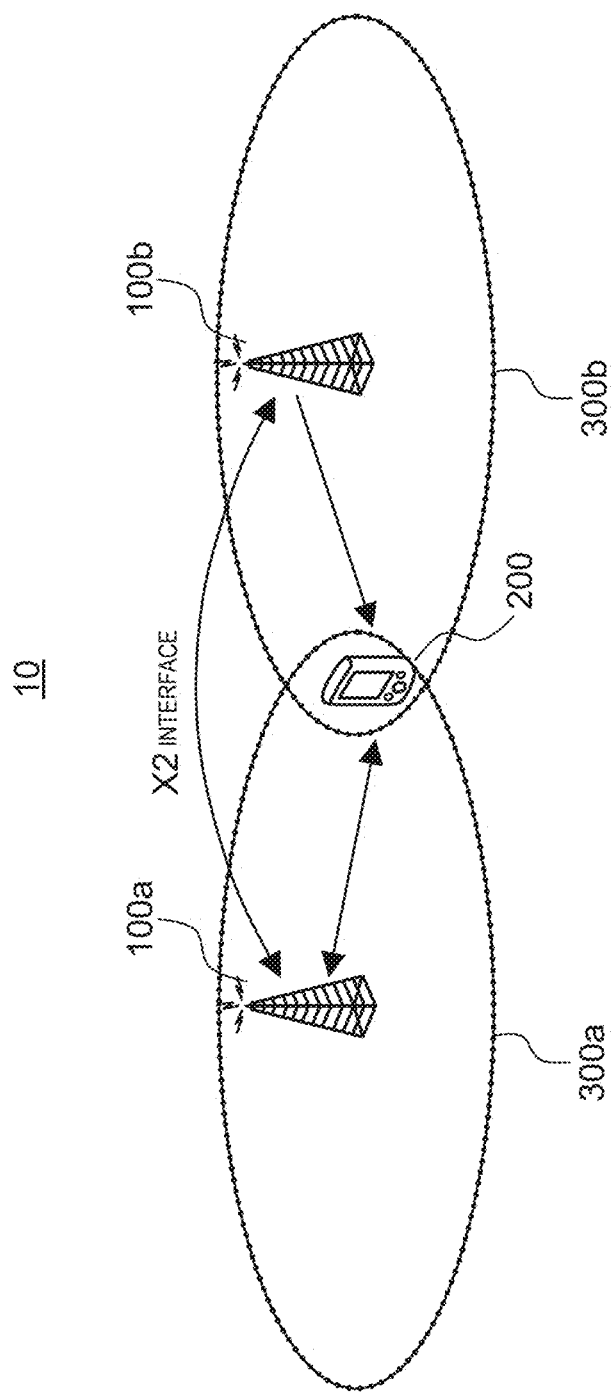
FIG. 1 is a diagram illustrating a configuration example of a communication system including a base station according to an embodiment of the present invention.

Hereinafter, an embodiment of the present invention will be described with reference to the drawings.
[Overview of Communication System 10]
FIG. 1 is a diagram illustrating a configuration example of a communication system including a base station according to an embodiment of the present invention. As illustrated in FIG. 1, communication system 10 is configured with a plurality of base stations 100a and 100b, and terminal 200.

Base station 100a communicates with terminal 200 existing in cell 300a, and base station 100b communicates with terminal 200 existing in cell 300b. In addition, base stations 100a and 100b communicate with terminal 200 existing in a cell edge in which cell 300a overlaps cell 300b, using a CoMP technology. In this case, one base station becomes a master and the other base station becomes a slave. For example, base station 100a is set as a master base station and base station 100b is set as a slave base station 2, in FIG. 1. An X2 interface is connected between base station 100a which is the master base station and base station 100b which is the slave base station.

Terminal 200 performs a wireless communication with base station 100a in cell 300a, measures received quality of a signal transmitted from base station 100a, and reports a CQI indicating transmission path quality to base station 100a. In the same manner, terminal 200 performs a wireless communication with base station 100b in cell 300b, measures received quality of a signal transmitted from base station 100b, and reports a CQI indicating transmission path quality to base station 100b. It is recommended that, for example, received quality RSRQ (Reference Signal Received Quality), received power RSRP (Reference Signal Received Power), or the like is used as a measurement value of the received quality.

In addition, in a case where a coordinated transmission is performed in a JT mode, terminal 200 receives user data from both base stations 100a and 100b.

[Configuration of Base Station 100a]

Next, configurations of base stations 100a and 100b will be described in detail. Both base stations 100a and 100b function as the master base station and the slave base station, and base stations 100a and 100b have the same configuration as each other. Hereinafter, base station 100a will be representatively described as a configuration of the base station.

FIG. 2 is a block diagram illustrating the configuration of the base station 100a according to the present embodiment. As illustrated in FIG. 2, base station 100a includes base station communication IF (InterFace: interface) 101, terminal communication IF 102, controller 103, and memory unit 104.

Base station communication IF 101 is an interface which communicates between base station 100a and base station 100b. Terminal communication IF 102 is an interface which communicates between base station 100a and terminal 200.

Controller 103 is a central calculation processing device, and executes various programs by using memory unit 104 as a work memory. A functional configuration of controller 103 according to the present invention will be described below.

Memory unit 104 includes a ROM (Read Only Memory) and a RAM (Random Access Memory), and stores various programs that controller 103 executes and various data. Particularly, in the present invention, memory unit 104 stores a mode of a CoMP technology set based on X2 transmission time measured when a station is installed, specifically, a JT mode or a Blanking mode.

[Functional Configuration of Controller 103]

Next, a functional configuration of controller 103 will be described in detail. Controller 103 includes coordinated transmission determining unit 111, coordinated mode selector 112, base station to base station coordinating controller 113, data generator 114, transmission information generator 115, transmission time measurer 116, and feedback information generator 117.

In a case where base station 100a functions as a master base station, coordinated transmission determining unit 111, coordinated mode selector 112, base station to base station coordinating controller 113, data generator 114, and transmission information generator 115 configured in controller 103 are used.

In a case where base station 100a functions as a slave base station, base station to base station coordinating controller 113, data generator 114, transmission time measurer 116, and feedback information generator 117 configured in controller 103 are used.

Coordinated transmission determining unit 111 determines whether or not coordinated transmission needs to be performed, based on a difference of received quality, for example, a difference of RSRP between base station 100a which is reported from terminal 200 connected to base station 100a through terminal communication IF 102 and base station 100b adjacent thereto. In a case where the difference of received quality is less than a first threshold, coordinated transmission determining unit 111 determines that coordinated transmission needs to be performed, outputs information indicating the determined results to base station to base station coordinating controller 113, and its own base station 100a functions as a master base station, and base station 100b adjacent thereto functions as a slave base station. Meanwhile, in a case where the difference of received quality is greater than or equal to the first threshold, coordinated transmission determining unit 111 determines that the coordinated transmission does not need to be performed, and outputs the information indicating the determined results to base station to base station coordinating controller 113. In a case where base station 100a functions as a slave base station for another terminal, coordinated transmission determining unit 111 does not perform processing.

In a case where base station 100a functions as a master base station, coordinated mode selector 112 compares the X2 transmission time included in feedback information received from base station 100b functioning as a slave base station through base station communication IF 101, with a second threshold. Coordinated mode selector 112 selects the JT mode in a case where the X2 transmission time is less than the second threshold, and selects the Blanking mode in a case where the X2 transmission time is greater than or equal to the second threshold, and outputs information indicating the determined results to base station to base station coordinating controller 113. In a case where base station 100a functions as a slave base station for another terminal, coordinated mode selector 112 does not perform processing.

When base station 100a does not perform the coordinated transmission, in a case where the determined results input from coordinated transmission determining unit 111 needs to perform the coordinated transmission, base station to base station coordination control is performed between base station to base station coordinating controller 113 and the base station 100b which functions as the slave base station through base station communication IF 101 such that the coordinated transmission according to a mode of the CoMP technology stored in memory unit 104 is performed. If the base station to base station coordination control is completed, base station to base station coordinating controller 113 outputs a signal (Hereinafter, referred to as coordinated transmission start instruction) instructing start of coordinated transmission to data generator 114, transmits the coordinated transmission start instruction to base station 100b functioning as a slave base station through base station communication IF 101, and also transmits the coordinated transmission start instruction to terminal 200 through terminal communication IF 102.

In addition, when base station 100a functions as a master base station and performs the coordinated transmission, in a case where the determined results input from coordinated transmission determining unit 111 need not perform the coordinated transmission, base station to base station coordinating controller 113 outputs a signal (Hereinafter, referred to as coordinated transmission end instruction) instructing end of the coordinated transmission to data generator 114, transmits the coordinated transmission end instruction to base station 100b functioning as a slave base station through base station communication IF 101, and also transmits the coordinated transmission end instruction to terminal 200 through terminal communication IF 102.

In addition, when base station 100a functions as a master base station and performs the coordinated transmission, in a case where it is determined that a mode of the CoMP technology changes by information indicating the selected results input from coordinated mode selector 112, the base station to base station coordination control is performed again between base station to base station coordinating controller 113 and base station 100b functioning as a slave base station such that the mode of the CoMP technology which is newly selected is performed. If the base station to base station coordination control is completed, base station to base station coordinating controller 113 outputs the coordinated transmission start instruction to data generator 114, transmits the coordinated transmission start instruction to base station 100b functioning as a slave base station through base station communication IF 101, and also transmits the coordinated transmission start instruction to terminal 200 through terminal communication IF 102.

In addition, in a case where base station 100a functions as a slave base station, the base station to base station coordination control is performed between base station to base station coordinating controller 113 and base station 100b such that the coordinated transmission according to the mode of the CoMP technology instructed by base station 100b functioning as a master base station is performed.

In addition, in a case where base station 100a functions as a slave base station, base station to base station coordinating controller 113 outputs the coordinated transmission start instruction or the coordinated transmission end instruction received from base station 100b functioning as a master base station through base station communication IF 101 to data generator 114.

In a case where base station 100a functions as a master base station, data generator 114 codes and modulates user data by using a coding rate and a modulation multilevel number based on CQI reported from terminal 200 through terminal communication IF 102, and wirelessly transmits the modulated user data to terminal 200 through terminal communication IF 102 at predetermined transmission timing.

In addition, in a case where base station 100a functions as a master base station and performs the coordinated transmission of the JT mode, data generator 114 outputs information necessary for base station 100b functioning as a slave base station to perform the coordinated transmission, such as, the user data, transmission timing information, and the CQI to transmission information generator 115.

In addition, in a case where base station 100a functions as a master base station and performs the coordinated transmission of the Blanking mode, data generator 114 outputs information (Hereinafter, referred to as resource information) indicating resources which are used for transmitting the user data to transmission information generator 115.

In addition, in a case where base station 100a functions as a slave base station and performs the coordinated transmission of the JT mode, data generator 114 receives transmission information from base station 100b functioning as a master base station through terminal communication IF 102, codes and modulates the user data included in the transmission information by using the coding rate and the modulation multilevel number based on the CQI included in the transmission information, and wirelessly transmits the modulated user data to terminal 200 through terminal communication IF 102 at transmission timing that the transmission timing information included in the transmission information indicates.

In addition, in a case where base station 100a functions as a slave base station and performs the coordinated transmission of the Blanking mode, data generator 114 receives the transmission information from base station 100b functioning as a master base station through terminal communication IF 102, and performs control such that the user data is not transmitted by wireless resources indicated by the transmission information.

In a case where base station 100a functions as a master base station, transmission information generator 115 generates the transmission information which is obtained by adding information indicating transmission time, that is, current time to information output from data generator 114, for example the user data, the transmission timing information, a set of the CQI, or the resource information, and transmits the generated transmission information to base station 100b functioning as a slave base station through base station communication IF 101. In a case where base station 100a functions as a slave base station, transmission information generator 115 does not perform any processing.

In a case where base station 100a functions as a slave base station and base station 100b functions as a master base station, transmission time measurer 116 receives the transmission information through terminal communication IF 102, measures X2 transmission time from a difference between transmission time of the transmission information indicated by time information included in the transmission information and reception time of the transmission information, and outputs the X2 transmission time to feedback information generator 117. In a case where base station 100a functions as a master base station, transmission time measurer 116 does not perform any processing.

In a case where base station 100a functions as a slave base station and base station 100b functions as a master base station, feedback information generator 117 generates feedback information including X2 transmission time output from transmission time measurer 116, and transmits the feedback information to base station 100b through base station communication IF 101. In a case where base station 100a functions as a master base station, feedback information generator 117 does not perform any processing.

[Operation of Base Stations 100a and 100b and Terminal 200]

Next, operations of base stations 100a and 100b and terminal 200 will be described. FIG. 3 is a sequence diagram illustrating a flow of operations of the base station according to the embodiment of the present invention and the terminal. In FIG. 3, description will be made by assuming that base station 100a functions as a master base station, base station 100b functions as a slave base station, and a coordinated mode stored in memory unit 104 of base station 100a when a station is installed is the JT mode.

First, terminal 200 regularly measures received quality of a signal transmitted from base station 100a, and reports received quality information indicating the measured results, for example, RSRP to base station 100a (ST301).

In a case where the coordinated transmission is not performed, base station 100a determines whether or not the coordinated transmission is needed, based on the received quality information reported from terminal 200. Here, in FIG. 3, it is assumed that base station 100a determines that the coordinated transmission needs to be performed (ST302).

In a case where the coordinated transmission starts, the base station to base station coordination control is performed between base station 100a and base station 100b (ST303). Base station 100a performs the coordinated transmission by using a coordinated mode or the JT mode stored in memory unit 104. A specific operation of the base station to base station coordination control of ST303 will be described. First, base station 100a transmits a coordinated transmission request (CoMP Request) according to the JT mode to base station 100b. Base station 100b determines (Resource Check) whether or not the coordinated transmission is performed from free resources of its own station, and notifies (CoMP Response) base station 100a of information indicating the free resources. Base station 100a secures (Response agreed) resources being used for the coordinated transmission among the free resources of base station 100b, and performs coordinated scheduling.

After base station to base station coordination control between base station 100a and base station 100b is completed, base station 100a transmits the coordinated transmission start instruction (CoMP of JT start notification) of the JT mode to terminal 200 (ST304), and transmits the coordinated transmission start instruction of the JT mode (CoMP of JT start notification) to base station 100b (ST305).

Base station 100a transmits the transmission information (user data, transmission timing information, CQI, time information) to base station 100b (ST306).

Thereafter, base station 100a and base station 100b transmit a signal including the user data to terminal 200 at the same transmission timing (ST307, ST308).

After receiving the signal including the user data from base station 100a and base station 100b, terminal 200 generates the CQI based on the JT mode, and reports the CQI to base station 100a (ST309).

Base station 100a determines whether or not the coordinated transmission is needed, based on received quality information notified from terminal 200. Here, in FIG. 3, it is assumed that base station 100a determines that the coordinated transmission needs to be performed (ST310).

In addition, base station 100b measures the X2 transmission time from a difference between the transmission time of the transmission information indicated by the time information from base station 100a and received time of the transmission information (ST311).

Base station 100b transmits feedback information including the measured X2 transmission time to base station 100a (ST312).

Base station 100a compares the X2 transmission time included in the feedback information transmitted from base station 100b with the second threshold, and selects a mode of the coordinated transmission. Here, in FIG. 3, it is assumed that the X2 transmission time is greater than or equal to the second threshold and base station 100a selects the Blanking mode (ST313).

In a case where the Blanking mode is selected, base station 100a needs to switch a mode of the coordinated transmission from the JT mode to the Blanking mode, and thus, the base station to base station coordination control between base station 100a and base station 100b is performed again (ST314). A specific operation of the base station to base station coordination control of ST314 will be described. First, base station 100a transmits the coordinated transmission request (CoMP Request) according to the Blanking mode to base station 100b. Base station 100b notifies base station 100a of information indicating approval of the Blanking mode, specifically, temporary stop of data transmission (CoMP Response).

After base station to base station coordination control between base station 100a and base station 100b is completed, base station 100a transmits the coordinated transmission start instruction of the Blanking mode (CoMP of Blanking start notification) to terminal 200 (ST315), and transmits the coordinated transmission start instruction of the Blanking mode (CoMP of Blanking start notification) to base station 100b (ST316).

Base station 100a transmits the transmission information (resource information, time information) to base station 100b (ST317).

Thereafter, base station 100a transmits a signal including the user data to terminal 200 at predetermined transmission timing (ST318).

After receiving the signal including the user data from base station 100a, terminal 200 generates the CQI based on the RSRP and the Blanking mode as received quality information, and reports the received quality information to base station 100a (ST319).

Base station 100b does not transmit a signal to terminal 200. However, base station 100b measures X2 transmission time (ST320).

Thereafter, operations of ST310 to ST320 are repeated.

In ST310, in a case where base station 100a determines that the coordinated transmission need not be performed, base station 100a transmits the coordinated transmission end instruction (CoMP stop notification) to terminal 200, and receives end response (CoMP stop notification Ack) from terminal 200. Thereafter, base station 100a transmits the coordinated transmission end instruction (CoMP stop notification) to base station 100b. Base station 100b releases (resource release) the resources used for the coordinated transmission, and notifies base station 100a of the end response (CoMP response).

[Effects]

As described above, according to the present embodiment, a base station functioning as a slave base station measures X2 transmission time, and a base station functioning as a master base station selects a JT mode in a case where the X2 transmission time is less than a second threshold, and selects a Blanking mode in a case where the X2 transmission time is greater than or equal to the second threshold. Thereby, in a case where coordinated transmission between the master base station and the slave base station is performed, an optimal mode is selected depending on a situation of a network, and thus, it is possible to increase performance of a system.

A configuration in which the slave base station measures the X2 transmission time is described in the aforementioned embodiment, but the present invention is not limited to this, and a configuration in which the master base station measures the X2 transmission time may be used.

In addition, in the aforementioned embodiment, a configuration in which the master base station selects a mode of coordinated transmission is described, but the present invention is not limited to this, and a configuration in which the slave base station selects the mode of coordinated transmission may be used. In this case, the slave base station may notify the master base station of a gist thereof only in a case where the mode of coordinated transmission changes, and thus, it is possible to prevent traffic due to feedback from increasing.

In addition, in the present embodiment, a case where the present invention is configured by hardware is described as an example, the present invention may be realized by software in cooperation with the hardware.

In addition, each functional block used for description of the aforementioned embodiment is realized as an LSI (large scale integration) that is typically an integrated circuit. These may be individually made into one chip, or may be made into one chip including a part or all thereof. Here, it is referred to as an LSI, but may be referred to as an IC (Integrated Circuit), a system LSI, a super LSI, or an ultra LSI, depending on the degree of integration.

In addition, a method of making into an integrated circuit is not limited to an LSI, or may be realized by a dedicated circuit or a general purpose processor. After an LSI is manufactured, an FPGA (Field Programmable Gate Array) which can be programmed, or a reconfigurable processor which can reconfigure a connection or setting of a circuit cell in the LSI may be used.

Furthermore, if a technology of an integrated circuit which is replaced with an LSI by another technology advanced or derived from a semiconductor technology appears, integration of functional blocks may be naturally performed by using the technology. Application or the like of biotechnology can be made.

INDUSTRIAL APPLICABILITY

The present invention can be applied to a communication system which uses a multipoint coordination technology.

REFERENCE MARKS IN THE DRAWINGS 100a, 100b base station
101 base station communication IF
102 terminal communication IF
103 controller
104 memory unit
111 coordinated transmission determining unit
112 coordinated mode selector
113 base station to base station coordinating controller
114 data generator
115 transmission information generator
116 transmission time measurer
117 feedback information generator
200 terminal
300a, 300b cell

The invention claimed is:

1. A base station which can perform coordinated transmission with another base station via an X2 interface that is defined by 3GPP (3rd Generation Partnership Project), comprising:
a circuitry, which, in operation:
receives an X2 transmission time from the another base station, the X2 transmission time being measured by the another base station, the X2 transmission time being a transmission time of data transmitted via the X2 interface;

sets a coordinated mode to a Joint Transmission (JT) mode in response to the X2 transmission time being less than a threshold;

sets the coordinated mode to a Blanking mode in response to the X2 transmission time being greater than or equal to the threshold; and performs base station to base station coordination control between the another base station and the base station so as to perform the coordinated mode.

2. The base station of claim 1 further comprising:

a memory unit which stores a coordinated mode set based on the X2 transmission time measured when a station is installed, wherein the base station to base station coordination controller performs the base station to base station coordination control between another base station and the base station so as to perform the coordinated mode stored in the memory unit, in a case where the coordinated transmission is performed.

3. The base station of claim 1, wherein, in response to the coordinated mode changing, the circuitry performs the base station to base station coordination control again so as to perform a coordinated mode which is newly selected.

4. A base station which can perform coordinated transmission with another base station via an X2 interface that is defined by 3GPP (3rd Generation Partnership Project), comprising:

a circuitry, which, in operation:

measures an X2 transmission time that is a transmission time of data transmitted via the X2 interface;

transmits the X2 transmission time to the another base station; and performs base station to base station coordination control between the another base station and the base station so as to perform a coordinated mode set by the another base station, the another base station, in operation, receives the X2 transmission time from the base station, sets the coordinated mode to a Joint Transmission (JT) mode in response to the received X2 transmission time being less than a threshold, and sets the coordinated mode to a Blanking mode in response to the received X2 transmission time being greater than or equal to the threshold.

5. The base station of claim 4, wherein the circuitry measures the X2 transmission time based on a difference between a transmission time of transmitted information being transmitted by the another base station, and a received time of the transmitted information being received by the base station.

6. A coordinated transmission mode selection method of a base station comprising:

determining whether or not a coordinated transmission with another base station should be performed based on a channel quality indicator transmitted from a terminal, the base station being configured to perform the coordinated transmission with the another base station via an X2 interface that is defined by 3GPP (3rd Generation Partnership Project);

receiving an X2 transmission time from the another base station, the X2 transmission time being measured by the another base station, the X2 transmission time being a transmission time of data transmitted via the X2 interface;

setting a coordinated mode to a Joint Transmission (JT) mode in response to determining that the coordinated transmission with the another base station should be performed and in response to the X2 transmission time being less than a threshold;

setting the coordinated mode to a Blanking mode in response to determining that the coordinated transmission with the another base station should be performed and in response to the X2 transmission time being greater than or equal to the threshold; and performing base station to base station coordination control between the another base station and the base station so as to perform the coordinated mode.

7. The base station of claim 2, wherein, in response to the coordinated mode changing, the circuitry performs the base station to base station coordination control again so as to perform a coordinated mode which is newly selected.

8. The base station of claim 1, wherein, in response to the coordinated mode changing, the circuitry performs the base station to base station coordination control again so as to perform a coordinated mode which is newly selected.

* * * * *